(12) United States Patent
Koh et al.

(10) Patent No.: US 8,719,156 B2
(45) Date of Patent: May 6, 2014

(54) PAYMENT LINK

(75) Inventors: Yeong-Ping Koh, Sunnyvale, CA (US); Steven C Chan, Singapore (SG); Arunachalam Muthu, Santa Clara, CA (US)

(73) Assignee: Ebay Inc., San Jose, CA (US)

( * ) Notice: Subject to any disclaimer, the term of this patent is extended or adjusted under 35 U.S.C. 154(b) by 156 days.

(21) Appl. No.: 12/826,336

(22) Filed: Jun. 29, 2010

(65) Prior Publication Data
US 2011/0320343 A1 Dec. 29, 2011

(51) Int. Cl.
*G06Q 40/00* (2012.01)
(52) U.S. Cl.
USPC .......................................................... 705/39
(58) Field of Classification Search
USPC ..................................................... 705/35–45
See application file for complete search history.

(56) References Cited

U.S. PATENT DOCUMENTS

| 5,715,314 A * | 2/1998 | Payne et al. ..................... 705/78 |
| 2002/0052841 A1 * | 5/2002 | Guthrie et al. ................... 705/40 |
| 2002/0107767 A1 * | 8/2002 | McClair et al. .................. 705/35 |
| 2003/0065576 A1 * | 4/2003 | Harris et al. ..................... 705/26 |
| 2006/0271497 A1 * | 11/2006 | Cullen et al. ..................... 705/64 |

* cited by examiner

*Primary Examiner* — Robert R Niquette
*Assistant Examiner* — Jennifer Liu
(74) *Attorney, Agent, or Firm* — Haynes and Boone, LLP (57) ABSTRACT

In one embodiment, an intended recipient of money transmits a payment link created by the recipient to an intended sender of money, where the link contains a locator to a site of a payment provider, information about the recipient (e.g., email address), and the amount of money to be sent. The link can be sent via email, text, IM, or other means. The sender then accesses the link, such as by clicking or tapping on the link, which launches a checkout or payment page for the sender on the payment provider site. The sender completes the payment page, and the payment is sent to the recipient by the payment provider.

20 Claims, 4 Drawing Sheets http://my.paypal.com/14089670000/$10

Fig. 1

Fig. 2 http://my.paypal.com/joe@ebay.com/$10

Fig. 3A http://my.paypal.com/joe@ebay.com/$10/lunch

Fig. 3B http://my.paypal.com/joe@ebay.com/10

Fig. 3C http://my.paypal.com/14089670000/$10

Fig. 3D http://my.paypal.com/pingster21/$10

Fig. 3E http://my.paypal.com/$10@shatner

PAYMENT LINK

BACKGROUND

1. Field of the Invention

The present invention generally relates to on-line payments, and in particular, to payments between two parties.

2. Related Art

More and more consumers are purchasing items and services over electronic networks, such as the Internet. Consumers routinely search for and purchase products and services from merchants and individuals alike. The transactions can take place directly between an on-line merchant or retailer and the consumer, where payment is typically made by entering credit card or other financial information. Transactions can also take place with the aid of an on-line payment provider, such as PayPal, Inc. of San Jose, Calif. Such payment providers can make transactions easier and safer for the parties. Payment providers enable payments to be made through many different convenient methods.

A payment to be made or received, such as after a purchase, a loan repayment, a donation, a gift, etc., can be accomplished in many different ways. Examples include a recipient issuing an invoice or a sender initiating a check-out procedure or payment procedure. This can be performed through a payment provider. However, obtaining payment from a sender may not always be prompt, due to many factors, including the inconvenience of the sender to make the payment. In one example, the recipient, which can be a merchant, seller, or anyone requesting money, sends a request to the sender for a payment. The request may be in the form of an electronic or paper invoice. Once received, the sender processes the invoice for payment, depending on the type of invoice.

For a paper invoice, the sender may review and then transmit payment information, such as credit card information, bank information, or a check. For an electronic invoice, the sender may need to enter recipient information and the sender's payment information in an electronic communication. This information may be cumbersome and time-consuming for the sender, which may cause the sender to delay entering the information, resulting in a delayed payment to the recipient.

Thus, there is a need for a way that make it easier for senders to make a payment or send money to recipients without the disadvantages of the conventional methods above.

SUMMARY

In accordance with different embodiments, an intended recipient of money transmits a human-readable or user-discernable link created by the recipient to an intended sender of money, where the link contains a locator to a site of a payment provider, information about the recipient, and the amount of money to be sent. The human-readable or user-discernable link is descriptive and in common language such that non-technical people can read the link and understand the meaning. The sender then accesses the link, such as by clicking on the link, which launches a checkout or payment page for the sender on the payment provider site. The sender completes the payment page, and the payment is sent to the recipient by the payment provider.

In one embodiment, the link has the format of http://[payment-provider_address]/[recipient_email]/[amount]. The recipient can transmit the link to the sender in any number of ways, including as part of an email, text, instant message, paper, or any other suitable medium. Clicking or going to the link launches a payment page from the payment provider site, which includes the recipient's information and the amount to be paid obtained through the link. The sender may then simply enter the sender's login information, such as a user name and password. Once verified, the sender views the recipient information and amount. If correct, the sender clicks on a button or link to confirm the payment. The payment is then sent to the designated recipient.

In other embodiments, the link may have different formats. For example, the link may include a descriptor of what the payment is for, and/or the recipient information may be a mobile number or a username from a social site. Another example is a link that does not include the payment amount. This allows the sender to enter in any suitable amount, which may be appropriate for soliciting charitable contributions. In different embodiments, the link is easily understood by both the sender and recipient, neither of which has to be technical and can both be layperson.

Using this method for payment provides numerous advantages. The recipient has an easy and intuitive way to create a payment link for transmitting to a sender. The sender has an easy to way make the payment by simply clicking on the link and entering in a small amount of readily-available information. The sender does not even have to have an account with the payment provider. As a result, a recipient may receive prompt payment due to the ease of which a sender can make the payment.

These and other features and advantages of the present invention will be more readily apparent from the detailed description of the embodiments set forth below taken in conjunction with the accompanying drawings.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Figure 1:
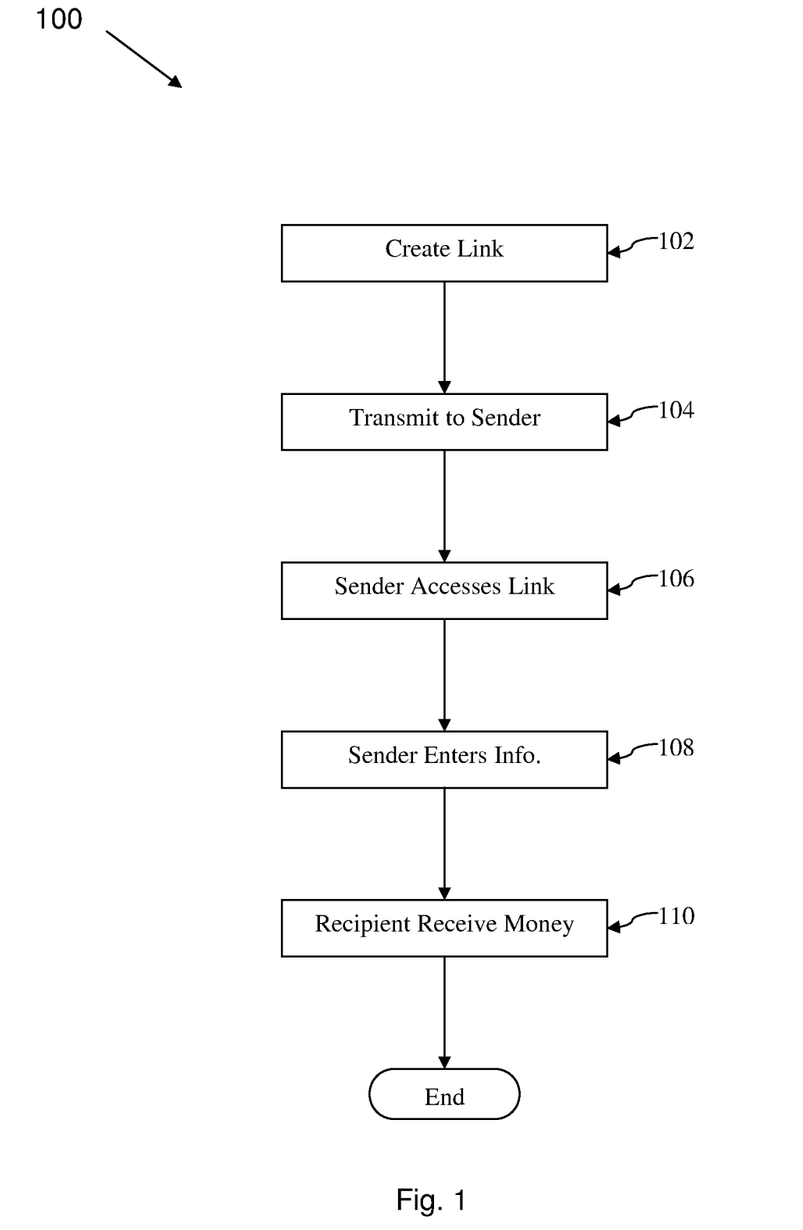
FIG. 1 is a flowchart showing a payment process using a user-created link according to one embodiment.

FIG. 1 is a flowchart 100 showing a process for a payment process using a recipient-created link, according to one embodiment. At step 102, a user, which in this embodiment, is a recipient, creates a payment link. In other embodiments, the user can be a money sender or another party, such as a payment provider. The link includes, at a minimum, information about a payment provider facilitating the payment process and information about the recipient of the payment. The link may also include the amount of payment, currency, and/or a brief description, such as the subject matter of the payment. One example of a link is http://my.paypal.com/ joe@ebay.com/10/lunch, although many different formats and/or fields may be suitable. In this example, the payment provider is PayPal, Inc. of San Jose, Calif., the recipient's information is an email address, the payment requested is $10 (default to dollars), and the payment is for lunch. Such links are easily understood by non-technical individuals.

Once the payment link is created, the link is transmitted to a money sender or payer at step 104. The transmission may be in any number of ways. For example, the user may send the link via a short message service (SMS) or text to the sender's mobile device. Because it is desirable to reduce the length of the SMS, the additional subject field above helps identify to the sender the purpose of the payment request without the recipient having to enter additional information into the SMS. Other examples of suitable transmissions are email, paper, and instant messaging (IM). With these, the sender may not need the subject field, as the sender can include the payment reason within the body of the transmission media. Depending on the transmission type, the link may be sent electronically or by postal service, such as part of a paper invoice or note.

After the link is transmitted and received by the sender, the sender access the link at step 106. Access can be by clicking on or selecting the link, copying and pasting the link into an Internet browser, re-typing the link into an Internet browser, or any other suitable means. For example, if the link is included in an SMS message, email, or IM message, the sender may simply tap on the link with a finger (on a mobile device, such as an iPad or iPhone) or click on the link with a mouse (on a PC) to access the link and open a new page based on information contained in the link. If the link was transmitted on paper or other non-electronic media, such that the link is not "live," the sender can re-type the link into an Internet browser to open the page associated with the link.

When the link is accessed at step 106, the sender is directed to a payment page of the payment provider identified in the link. Other information in the link may also be included, such as the recipient of the payment, the amount, and the subject of the payment. The payment page may request the user to enter certain information, including the payment amount if not specified in the link. If the sender wishes to make the requested payment to the user or recipient, the sender enters the requested information at step 108.

The requested information may depend on whether the sender has an account with the payment provider. If the sender has an account, the sender may be requested to enter the sender's password and log into the account. The sender's email, username, or other identifier may be automatically filled in based on information transmitted from the sender's device (e.g., mobile device or PC) or the sender may be asked to enter that information as well.

If the sender does not have an account, the sender may be requested to enter information required to make the payment through an accepted funding source. In one embodiment, the requested information includes one or more of the following: the sender's first name, last name, funding source account number (such as a credit card number or bank account number), type of funding source, expiration date of the funding source, security code of the funding source, and the sender's billing address. The sender may also have the option of creating an account with the payment provider at the same time. In that case, the user may also be asked to provide a password and possibly a user name or other identifier.

The requested information above for the situation where the sender has an account with the payment provider and when the sender does not have an account with the payment provider may be presented on the same page when the sender access the payment link. For example, requested log in information may be on a right side of the page and requested funding source information may be on a left side of the page. This enables the sender to select a different funding source, even if the sender has an account with the payment provider.

After the appropriate information is entered at step 108, the information is processed by the payment provider. In one example, the payment provider obtains account information of the recipient through the recipient's information contained in the link, e.g., the recipient's email address. With this information, the payment provider is able to transfer funds into the recipient's account. The payment provider also determines whether to approve payment from the sender, such as checking whether sufficient funds exist in the sender's designated funding source and the accuracy of the sender's entered information. If the payment is approved, the payment provider transfers funds from the sender's funding source and credits the amount to the recipient's account. Thus, at step 110, the recipient receives the requested amount.

Figure 2:
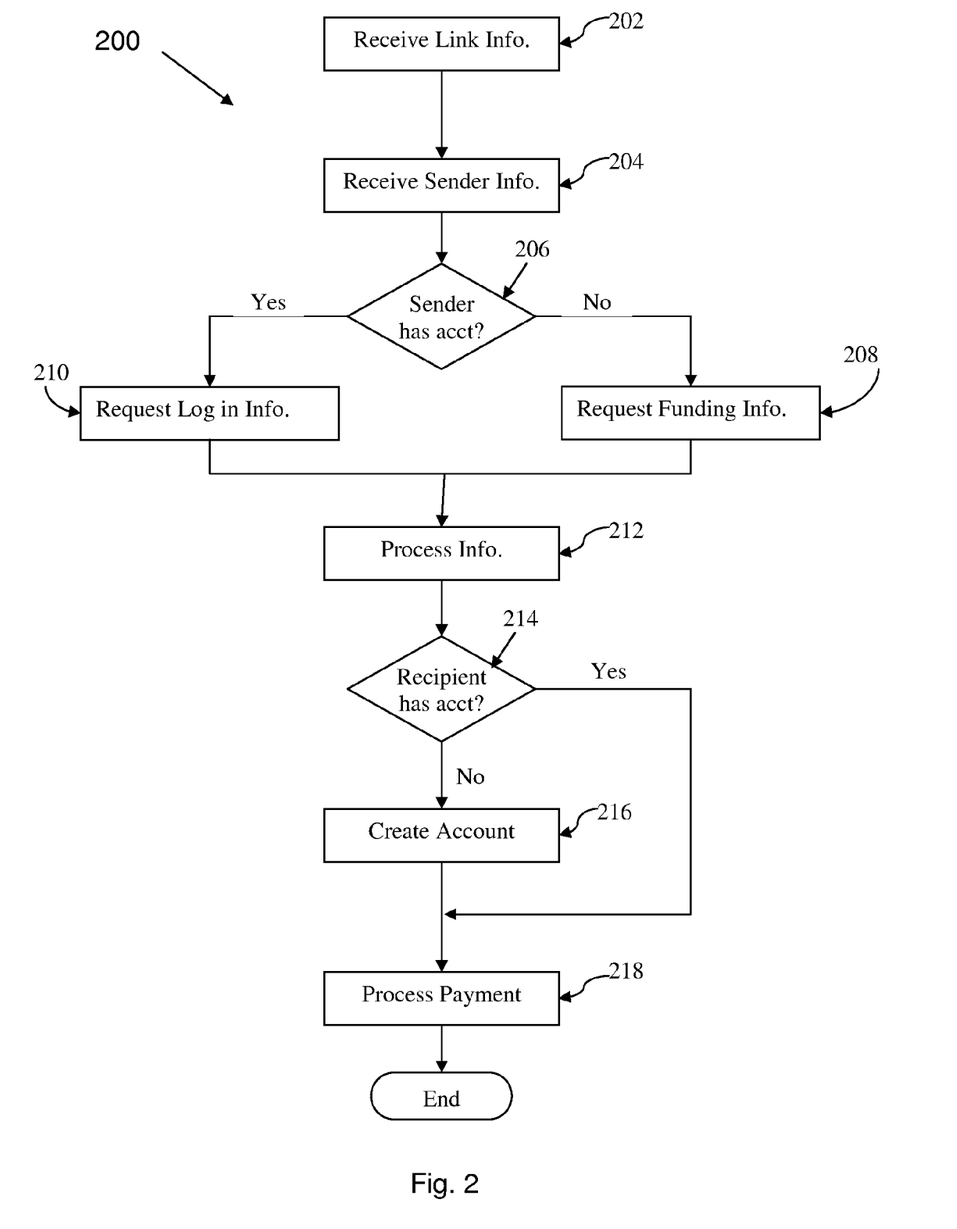
FIG. 2 is a flowchart showing a process for payment provider in making a payment based on a user-created link, according to one embodiment.

FIG. 2 is a flowchart 200 showing a process for a payment provider in making a payment based on a user-created link, according to one embodiment. At step 202, the payment provider, such as PayPal, Inc., receives information from a payment link when a sender access the link as discussed above. Information contained in the link about the payment provider is used to direct the communication to the payment provider site. Information contained in the link and received by the payment provider includes an identifier of a recipient, such as an email address, and optionally a payment amount, currency, and the subject of the payment or other descriptor.

The payment provider also receives information about the sender, at step 204. Note that sender information may be received at the same time that the link information is received at step 202, and thus, steps 202 and 204 need not be sequential. The sender information can be obtained from the device used by the sender to access the payment link. For example, if the sender accesses the link through a PC, information from the PC associated with the sender, such as the IP address or cookies, is transmitted to the payment provider. Similarly, if the sender access the link through a smart phone, information, such as the phone number, associated with the sender is received by the payment provider. If, for some reason, sender information is not received or the received information is not correct (such as if the sender is using another person's computing device), the sender may correct that information on the payment provider site.

Once the payment provider has received the sender information, a determination is made, at step 206, whether the sender has an account with the payment provider. For example, using the sender information, such as a phone number or email address, the payment provider can check whether there is an associated account. If there is no account, the payment provider requests the sender to enter information about a funding source at step 208. This may include selecting an acceptable funding instrument, such as a type of credit card, a debit card, a bank account, etc., and filling out information such as account number, billing address, name, phone number, expiration date, security code, etc. for the selected funding instrument. The payment provider may also ask the sender if the sender wants to open an account with the payment provider. If yes, the sender may then be requested to enter information to create an account, such as a user name and password. The request for account creation and entering information can also be performed after the payment has been processed.

If, as determined at step 206, the sender has an account with the payment provider, the payment provider asks the sender to enter log in information at step 210, such as a user name and password or other account identifiers. The user name may already appear in the request if the payment provider can provide that through the received sender information. If the user name is not for the sender, such as if the sender is using another person's device to make the payment, the sender can enter the sender's user name in the appropriate field.

After the requested information is entered at steps 208 or 210, the payment provider processes the information at step 212. If the information was from step 208, the payment provider may verify that the entered information is associated with a valid funding instrument. If the payment provider cannot authenticate the information, the payment provider may request the sender to re-enter all or part of the information or select another funding instrument. If the information was from step 210, the payment provider may verify that the entered password matches with the user name associated with the account. If not, the payment provider may ask the sender to re-enter the password. In one embodiment, when the payment provider cannot confirm the information, either from step 208 or 210, after a specific number of attempts, the process ends and the sender is notified to try again later. In other embodiments, the sender is given an unlimited number of attempts to either enter valid funding source information or valid log in information. If the payment amount was not part of the information contained in the link, the payment provider may request the sender enter a payment amount and a currency type, e.g., U.S. dollars, Euros, etc.

Next, at step 214, a determination is made whether the recipient has an account with the payment provider. This can be made using the recipient information contained in the link received at step 202. In one embodiment, the link contains an email address of the recipient, which the payment provider may use to determine whether an account exists corresponding to the email. If no account exists, the recipient may be asked to create an account, such as by the payment provider sending a notification to the recipient at the email address provided in the payment link. The email may include a message that there is a payment for the recipient, and to collect the payment, the recipient needs to log into the recipient's account with the payment provider or create an account with the payment provider.

If there is no account for the recipient, the recipient is asked to create an account in order to receive payment. In one embodiment, a request is made to enter a user name and password, along with any other needed information such as name, address, phone number, email address, and financial instrument information (where funds can be transferred from or deposited into). The recipient may be asked to re-enter the user name and password. If the requested information is accepted by the payment provider, an account is created at step 216.

Once the recipient has an account with the payment provider, the payment provider processes the payment at step 218. For example, the payment provider debits the payment amount from the sender's account or selected funding source and credits the recipient's account with the payment provider. The recipient and/or the sender may be notified, such as by email, that the payment has been processed.

In other embodiments, when the sender has been authenticated by the payment provider, a notification is sent to the intended recipient that the recipient has a payment waiting. The notification, which may be sent via email, text, or other means, can also include the payment amount and the sender's name or other information. In order to retrieve the payment, the recipient may be requested to log into the recipient's account with the payment provider, such as clicking or otherwise selecting a link in the notification and entering a password and possibly a user name. If the recipient does not have an account, the notification may ask the recipient to create an account with the payment provider to retrieve the payment. Again, a link may be provided so that the recipient is directed to the payment provider site to enter requested information for creating an account.

Thus, using the process described above, a recipient of money can quickly and easily create a payment link that is easily communicated to an intended sender of the money. This can be within a social or business context. For example, two friends may be at a restaurant eating lunch, but one person does not have enough money or the ability to pay for his portion of the meal or one person decides it is easier to pay without having the server split the check. In this situation, the person paying (recipient) can create a payment link at any time and transmit the link to the other person (sender) for payment of the other person's portion of the meal. The payment link can also be used by merchants to create invoices for goods or services delivered but not yet paid for. The merchant can then send the link, as an invoice, to the person who purchased the goods or services for payment.

Using the payment link also allows the sender to quickly and easily make a payment. As discussed above, the sender can receive a payment request instantaneously and at any time through a delivery by email, text, IM, etc. The sender then just needs to access the link, which may be as simple as clicking or tapping the link to be directed to a payment page of the payment provider. Next, the sender logs into the account and makes the payment. Thus, the process may be as simple as clicking on a link and typing in a password.

Furthermore, as discussed above, the sender is not even required to have an account with the payment provider because other funding sources can be used to make the payment.

Figure 3A:
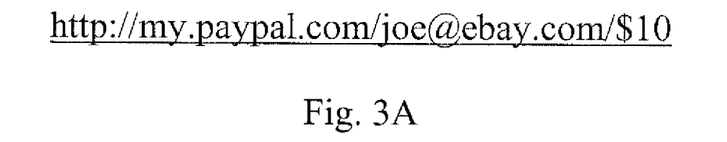
FIGS. 3A-3F are exemplary formats of a user-created link according to different embodiments.
Figure 3B:
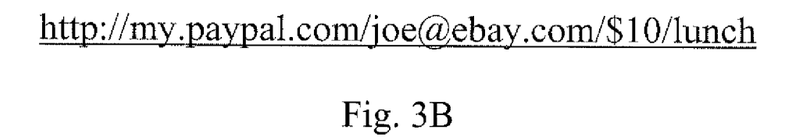

FIGS. 3A-3F are exemplary formats of a user or recipient created payment link according to different embodiments. As discussed above, the payment link can include different fields and have different formats. FIG. 3A shows a format with the payment provider site, the recipient email, and the payment amount with currency type. Note that any type of dotcom address may be suitable, such as ones created by the payment provider specifically for processing payment links. FIG. 3B is the same as the link of FIG. 3A except for the addition of a payment subject, which is "lunch" in this example. Other examples of subjects may be a reference number to an invoice or an invoice number.

Figure 3C:
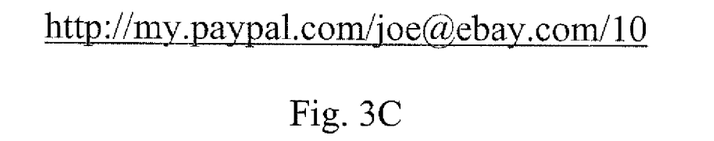

FIG. 3C shows a link similar to the one of FIG. 3A except that the currency type is not included. In such a situation, the payment provider may default to a standard currency, such as U.S. dollars. The default may also be determined by the geographic location of the recipient, which the payment provider would have as part of the account information of the recipient, or the geographic location of the sender, such as determined by the sender's account information or the billing information of the sender's funding source. The default currency may be changed by the sender in some embodiments. Where a currency type is required, the payment provider may accept different formats, such as US$50, 50USD, etc., to indicate the currency as U.S. dollars.

Figure 3D:
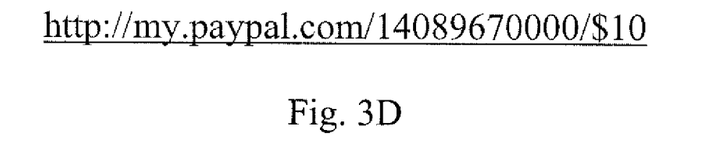
Figure 3E:
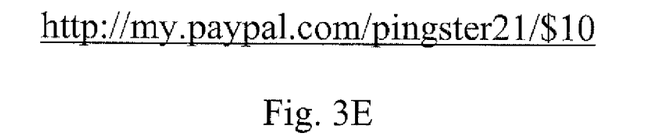
Figure 3F:
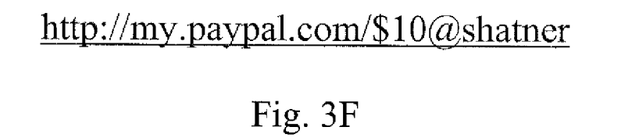

FIGS. 3D to 3F show links with recipient identifiers different than an email address. FIG. 3D uses the recipient's phone number as the recipient identifier. FIG. 3E uses the recipient's Facebook™ name as the recipient identifier, and FIG. 3F uses the recipient's Twitter™ name as the recipient identifier. Other types of identifiers may also be suitable, as long as they uniquely identify the recipient to the payment provider.

Figure 4:
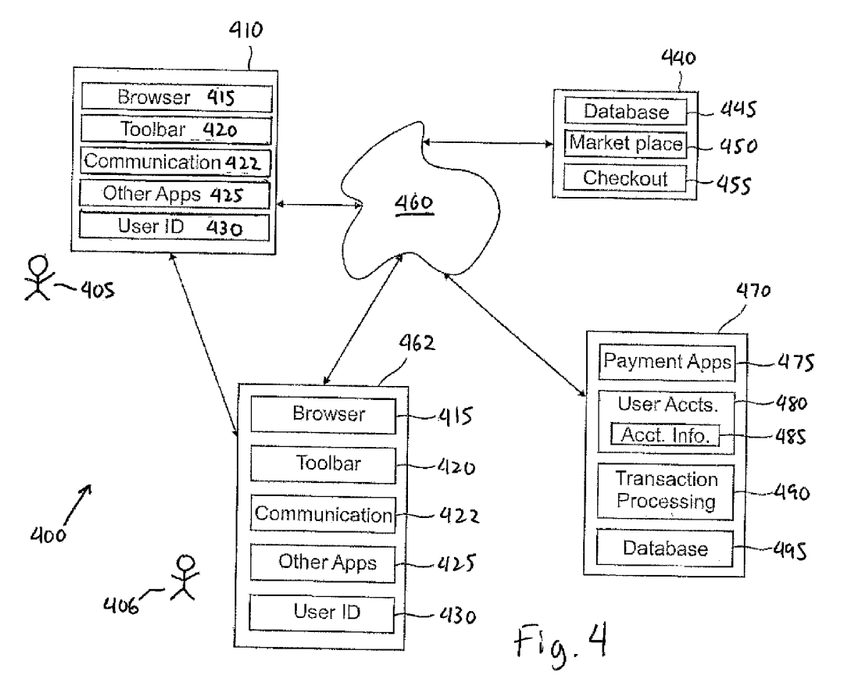
FIG. 4 is block diagram of a networked system suitable for implementing the process of FIG. 1 in accordance with an embodiment of the invention.

FIG. 4 is a block diagram of a networked system 400 configured to handle a financial transaction between a recipient and a sender, such as described above, in accordance with an embodiment of the invention. System 400 includes a first user device 410, a second user device 462, a merchant server 440, and a payment service provider server 470 in communication over a network 460. Payment service provider server 470 may be maintained by a payment provider, such as PayPal, Inc. of San Jose, Calif. A first user 405, such as a sender person or merchant, utilizes first user device 410, and a second user 406, such as a recipient person or merchant, utilizes and second user device 462 for performing a transaction with a payment provider.

First user device 410, second user device 462, merchant server 440, and payment service provider server 470 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

Network 460 may be implemented as a single network or a combination of multiple networks. For example, in various embodiments, network 460 may include the Internet or one or more intranets, landline networks, wireless networks, and/or other appropriate types of networks.

First user device 410 and second user device 462 may be implemented using any appropriate hardware and software configured for wired and/or wireless communication over network 460. For example, in one embodiment, the two user devices may be implemented as a personal computer (PC), a smart phone, personal digital assistant (PDA), laptop computer, and/or other types of computing devices capable of transmitting and/or receiving data, such as an IPad™ from Apple™

First user device 410 may include one or more browser applications 415 which may be used, for example, to provide a convenient interface to permit first user 405 to browse information available over network 460. For example, in one embodiment, browser application 415 may be implemented as a web browser configured to view information available over the Internet. First user device 410 may also include one or more toolbar applications 420 which may be used, for example, to provide client-side processing for performing desired tasks in response to operations selected by first user 405. In one embodiment, toolbar application 420 may display a user interface in connection with browser application 415 as further described herein.

First user device 410 may further include other applications 425 as may be desired in particular embodiments to provide desired features to first user device 410. For example, other applications 425 may include security applications for implementing client-side security features, programmatic client applications for interfacing with appropriate application programming interfaces (APIs) over network 460, or other types of applications. Applications 425 may also include email, texting, voice and IM applications that allow first user 405 to send and receive emails, calls, and texts through network 460, as well as create and/or access payment links as discussed above. First user device 410 includes one or more user identifiers 430 which may be implemented, for example, as operating system registry entries, cookies associated with browser application 415, identifiers associated with hardware of first user device 410, or other appropriate identifiers, such as used for payment/user/device authentication. In one embodiment, user identifier 430 may be used by a payment service provider to associate first user 405 with a particular account maintained by the payment service provider as further described herein. A communications application 422, with associated interfaces, enables first user device 410 to communicate within system 400.

Second user device 462 may have similar applications and modules as first user device 410, but is used, in this example, for creating and sending a payment link to request money from first user 405. Second user device 462 may also include one or more browser applications 415 and one or more toolbar applications 420 which may be used, for example, to provide a convenient interface to permit second user 406 to browse information and perform tasks over network 460. For example, in one embodiment, browser application 415 may be implemented as a web browser configured to view information available over the Internet and communicate with merchant server 440 to receive and send information about purchases made through merchant server 440.

Second user device 462 may further include other applications 425 such as security applications for implementing client-side security features, programmatic client applications for interfacing with appropriate application programming interfaces (APIs) over network 460, or other types of applications. Applications 425 may also include email, text, IM, and voice applications that allow second user 406 to communicate through network 460 and create and send payment links through network 460. Second user device 462 includes one or more user identifiers 430 which may be implemented, for example, as operating system registry entries, cookies associated with browser application 415, identifiers associated with hardware of second user device 462, or other appropriate identifiers, such as used for payment/user/device authentication, e.g., the phone number associated with second user device 462. Identifiers may be used by a payment service provider to associate second user 406 with a particular account maintained by the payment service provider.

Merchant server 440 may be maintained, for example, by an on-line merchant offering various products and/or services in exchange for payment to be received over network 460. Merchant server 440 includes a database 445 identifying available products and/or services (e.g., collectively referred to as items) which may be made available for viewing and purchase by first user 405. Accordingly, merchant server 440 also includes a marketplace application 450 which may be configured to serve information over network 460 to browser 415 of first user device 410 and second user device 462. In one embodiment, first user 405 may interact with marketplace application 450 through browser applications over network 460 in order to view various products or services identified in database 445.

Merchant server 440 also includes a checkout application 455 which may be configured to facilitate the purchase by first user 405 of goods or services identified by marketplace application 450. Checkout application 455 may be configured to accept payment information from first user 405 through payment service provider server 470 over network 460. For example, checkout application 455 may receive and process a payment confirmation from payment service provider server 470, as well as transmit transaction information to the payment provider and receive information from the payment provider (e.g., a transaction ID). Checkout application 455 may also enable payment through second user device 462 in communication with the payment provider by using a payment link as described herein.

Payment service provider server 470 may be maintained, for example, by an online payment service provider which may provide payment between first user 405, second user 406, and the operator of merchant server 440. In this regard, payment service provider server 470 includes one or more payment applications 475 which may be configured to interact with first user device 410, second user device 462, and/or merchant server 440 over network 460 to facilitate the purchase of goods or services by first user 405 of first user device 410 or payment between first user device 410 and second user device 462.

Payment service provider server 470 also maintains a plurality of user accounts 480, each of which may include account information 485 associated with individual users. For example, account information 485 may include private financial information of users of devices such as account numbers, passwords, device identifiers, user names, phone numbers, credit card information, bank information, or other financial information which may be used to facilitate online transactions by first user 405. Advantageously, payment application 475 may be configured to interact with merchant server 440 on behalf of first user 405 during a transaction with checkout application 455 to track and manage purchases made by users.

A transaction processing application 490, which may be part of payment application 475 or separate, may be configured to receive information from a user device and/or merchant server 440 for processing and storage in a payment database 495. Transaction processing application 490 may include one or more applications to process information from a payment link and the sender of the payment link (e.g., first user 405) to determine the recipient and sender of funds and the amount of funds to be transferred. Other funding sources may also be processed through this application. Payment application 475 may be further configured to determine the existence of accounts for first user 405 and/or second user 406, as well as create new accounts if necessary.

Note that in different embodiments, system 400, merchant server 440 is not needed, as first user device 410 and second user device 462 may communicate directly with each other and with payment service provider server 470 to process payment requests and transfers between first user 405 and second user 406. One example is if second user 406 lends money to first user 405, such as buying dinner for first user 405. Second user device 462 can then create and transmit a payment link to first user device 410, first user device 410 then access the link and communicates with payment service provider server 470, which then processes the payment request and effects a payment from first user 405 to second user 406.

In the above embodiments, transmission and receipt of the payment link is through electronic means. However, as discussed herein, the payment link can also be transmitted on paper through conventional non-electronic means, such as via the postal service or other delivery service. Thus, in these embodiments, the first user may receive the payment link on a hard copy and then enter the payment link into first user device 410 to continue the payment process with payment service provider server 470.

Figure 5:
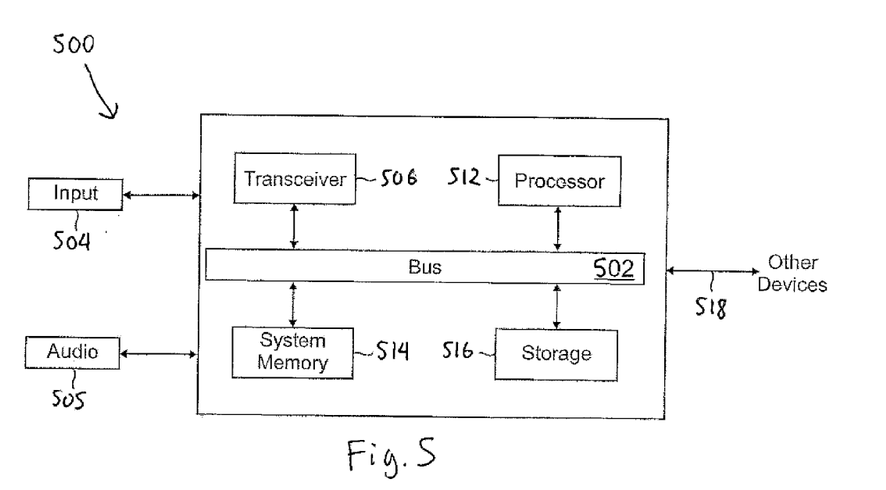
FIG. 5 is a block diagram of a computer system suitable for implementing one or more components in FIG. 4 according to one embodiment of the present disclosure.

FIG. 5 is a block diagram of a computer system 500 suitable for implementing one or more embodiments of the present disclosure. In various implementations, the user device may comprise a personal computing device (e.g., a personal computer, laptop, smart phone, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard (creating the payment link), selecting one or more buttons or links (accessing the payment link), etc., and sends a corresponding signal to bus 502. I/O component 504 may also include an output component, such as a display. An optional audio input/output component 505 may also be included to allow a user to use voice for inputting information by converting audio signals. Audio I/O component 505 may allow the user to hear audio. A transceiver 506 transmits and receives signals between computer system 500 and other devices, such as another user device, a merchant server, or a payment provider server. In one embodiment, the transmission is wireless, although other transmission mediums and methods may also be suitable. A processor 512, which can be a micro-controller, digital signal processor (DSP), or other processing component, processes these various signals, such as for display on computer system 500 or transmission to other devices via a communication link 518. Processor 512 may also control transmission of information, such as cookies or IP addresses, to other devices.

Components of computer system 500 also include a system memory component 514 (e.g., RAM) and a static storage component 516 (e.g., ROM). Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that comprise bus 502. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, payment links of different formats and fields have been described, but they are not exhaustive. Depending on the payment provider, other syntax, formats, and/or fields may be used to create the payment link. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method performed by a computer, comprising:
  receiving, by a computer of a payment provider from a sender of funds, information contained in a user-discernable payment link consisting of a protocol prefix followed by a colon, a locator to a site of the payment provider, an amount of payment, a plurality of slashes, and a phone number of a recipient of funds when the sender accesses the user-discernable payment link generated by and received from the recipient, wherein the recipient and sender are individuals;
  determining, by the computer, an account of the recipient of the funds based on the phone number of the recipient contained in user-discernable payment link;
  directing the sender to a site of the payment provider;
  processing, by the computer, information obtained through the site from the sender of the funds; and
  transferring an amount of the funds to the account of the recipient, wherein the account is with the payment provider.

2. The method of claim 1, wherein the payment link further comprises a subject of the funds.

3. The method of claim 1, wherein the information from the sender is obtained from a device of the sender transmitting the payment link.

4. The method of claim 1, wherein the payment link is received by the sender on a computing device capable of communicating with the payment provider.

5. The method of claim 4, wherein the payment link is received via email, text, or instant messaging.

6. The method of claim 1, further comprising:
  requesting log in information from the sender if the sender has an account with the payment provider; and
  requesting information for a funding source from the sender if the sender does not have an account with the payment provider.

7. The method of claim 6, further comprising providing an option to the sender of using a different funding source even if the sender has an account with the payment provider.

8. The method of claim 1, further comprising notifying the recipient that a payment is waiting.

9. The method of claim 8, wherein the notifying comprises transmitting a message to the recipient by email.

10. The method of claim 1, further comprising requesting the sender to enter the amount to be transferred.

11. A non-transitory machine-readable medium comprising a plurality of machine-readable instructions which when executed by one or more processors of a server are adapted to cause the server to perform a method comprising:
  receiving, from a sender of funds, information contained in a user-discernable payment link consisting of a protocol prefix followed by a colon, a locator to a site of the payment provider, an amount of payment, a plurality of slashes, and a phone number of a recipient of funds when the sender accesses the user-discernable payment link generated by and received from the recipient, wherein the recipient and sender are individuals;
  determining an account of the recipient of the funds based on the phone number of the recipient contained in user-discernable payment link;
  directing the sender to a site of the payment provider;
  processing information obtained through the site from the sender of the funds; and
  transferring an amount of the funds to an account of the recipient, wherein the account is with a payment provider.

12. The non-transitory machine-readable medium of claim 11, wherein the information from the sender is obtained from a device of the sender transmitting the payment link.

13. The non-transitory machine-readable medium of claim 12, wherein the payment link is received via email, text, or instant messaging.

14. The non-transitory machine-readable medium of claim 11, wherein the method further comprises providing an option to the sender of using a different funding source even if the sender has an account with the payment provider.

15. The non-transitory machine-readable medium of claim 11, wherein the method further comprises notifying the recipient by email that a payment is waiting.

16. An electronic payment processing system comprising:
  a non-transitory memory storing user account information, wherein the information comprises an identifier for a user account; and
  a hardware processor for
    receiving, from a sender of funds, information contained in a user-discernable payment link consisting of a protocol prefix followed by a colon, a locator to a site of the payment provider, an amount of payment, a plurality of slashes, and a phone number of a recipient of funds when the sender accesses the user-discernable payment link generated by and received from the recipient, wherein the recipient and sender are individuals;
    determining an account of the recipient of the funds based on the phone number of the recipient contained in user-discernable payment link;
    directing the sender to a site of the payment provider;

processing information obtained through the site from the sender of the funds; and transferring an amount of the funds to an account of the recipient, wherein the account is with a payment provider.

17. The system of claim 16, wherein the payment link is received via email, text, or instant messaging.

18. The system of claim 16, wherein the hardware processor further requests the sender to enter the amount to be transferred.

19. The system of claim 16, wherein the information from the sender is obtained from a device of the sender transmitting the payment link.

20. The system of claim 16, wherein the hardware processor further provides an option to the sender of using a different funding source even if the sender has an account with the payment provider.

* * * * *